United States Patent
Saita et al.

(10) Patent No.: US 8,148,477 B2
(45) Date of Patent: Apr. 3, 2012

(54) TUBULAR FLOW REACTOR AND METHOD OF MANUFACTURING POLYMERIC RESIN FINE PARTICLE

(75) Inventors: Yasuharu Saita, Tokyo (JP); Masashi Mamino, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 12/921,517

(22) PCT Filed: Mar. 2, 2009

(86) PCT No.: PCT/JP2009/053850
§ 371 (c)(1),
(2), (4) Date: Sep. 8, 2010

(87) PCT Pub. No.: WO2009/113419
PCT Pub. Date: Sep. 17, 2009

(65) Prior Publication Data
US 2011/0040049 A1 Feb. 17, 2011

(30) Foreign Application Priority Data
Mar. 14, 2008 (JP) .................................. 2008-065482

(51) Int. Cl.
*C08F 2/00* (2006.01)
*B01J 19/18* (2006.01)
*B01F 7/16* (2006.01)
*C08F 220/12* (2006.01)

(52) U.S. Cl. .......... 526/64; 526/909; 526/918; 422/135; 422/225; 366/98

(58) Field of Classification Search .................. 422/135; 526/64, 918, 909; 366/98
See application file for complete search history.

(56) References Cited

U.S. PATENT DOCUMENTS

| | | | |
|---|---|---|---|
| 3,434,804 A * | 3/1969 | Winn | 422/135 |
| 4,383,093 A * | 5/1983 | Shiraki et al. | 526/64 |
| 2008/0226513 A1* | 9/2008 | Morbidelli et al. | 422/135 |

FOREIGN PATENT DOCUMENTS

| JP | 10120720 | 5/1998 |
|---|---|---|
| JP | 2003140386 | 5/2003 |

(Continued)

OTHER PUBLICATIONS

Machine translation of JP 10-120720 A; publication date: May 1998.*

*Primary Examiner* — Fred M Teskin
(74) *Attorney, Agent, or Firm* — Lucas & Mercanti, LLP (57) ABSTRACT

In the present invention, a tubular flow reactor can maintain a plug flow property even though the tubular flow reactor is downsized, and provided is the tubular flow reactor with which uniform resin fine particles exhibiting a narrow particle size distribution and a narrow molecular weight distribution can be prepared when the tubular flow reactor is used for preparation of the resin fine particle via emulsion polymerization or the like. Disclosed is a tubular flow reactor possessing a stirring blade and a cylindrical channel, wherein a ratio d/D is 0.3-0.9 when a diameter of the stirring blade is represented by d and an inner diameter of the cylindrical channel is represented by D, and a ratio Lb/La is 0.80-0.99 when a length of the stirring blade is represented by Lb and a length of the cylindrical channel is represented by La.

2 Claims, 4 Drawing Sheets

FOREIGN PATENT DOCUMENTS

| | | |
|---|---|---|
| JP | 2004523607 | 8/2004 |
| JP | 2004250627 | 9/2004 |
| JP | 2007517942 | 7/2007 |
| JP | 2007526392 | 9/2007 |
| JP | 2008069266 | 3/2008 |
| JP | 2008291250 | 12/2008 |

\* cited by examiner

TUBULAR FLOW REACTOR AND METHOD OF MANUFACTURING POLYMERIC RESIN FINE PARTICLE

This is a 371 of PCT/JP2009/053850 filed Mar. 2, 2009 which in turn claimed the priority of Japanese Patent Application No. 2008-065482 filed Mar. 14, 2008, both applications are incorporated by reference herein.

TECHNICAL FIELD

The present invention relates to a tubular flow reactor, and a method of preparing polymeric resin fine particles employing the tubular flow reactor.

BACKGROUND

As methods of preparing polymeric resin fine particles (resin fine particles) industrially via an emulsion polymerization method or a suspension polymerization method, known are methods of preparing those employing a batch type reactor or a continuous type reactor.

The batch reactor produced problems such as large non-production time which is not related to a polymerization reaction, increased initial plant investment for a large sized reactor; and an increasing amount of energy consumption to make up for heat transfer capacity.

On the other hand, it is advantageous in a continuous type reactor that non-production time can be largely reduced, and the apparatus is possible to be reduced in size, and it is employed by taking advantage of this merit.

A continuous type reactor is mainly a reactor such as a tank type reactor or a tube type reactor. Since a tabular flow-feeding apparatus as a continuous type reactor of the two has a simple structure, and makes a suppressed residence time distribution to be small, it has been used for preparation of a polymeric resin material as many cases desired for the reaction system showing small variations in the reaction conditions such as a temperature distribution, a stirring speed and so forth (refer to Patent Documents 1-3, for example).

Specifically, in the foregoing Patent Document 1, disclosed is a technique in which an inner diameter of a reactor tube constituting a tube type reactor used for a polymerization apparatus to prepare toner via a polymerization method, and a circulation line speed and properties of a polymerizable monomer composition dispersion are specified. Further, in Patent Document 2, disclosed is a technique in which a fluoropolymer is prepared with a tube type polymerization reactor by specifying a cross-section of a channel. Further, in Patent Document 3, disclosed is a technique in which a (meth)acrylic acid ester-styrene copolymer for an optical member is manufactured with a polymerization apparatus equipped with a plug flow type reactor.

However, as one of methods to obtain polymeric resin fine particles exhibiting a sharp particle size distribution and a narrow molecular weight distribution, there is a method of conducting polymerization reaction in a state where a plug flow property is acquired. "Plug flow property" also called "pressed flow property" is that the polymerization reaction is accelerated in a polymerizable monomer composition dispersion moving inside a reactor to form resins, and the moving dispersion is controlled in such a way that a concentration distribution of the composition is maintained in an even state. That is, the dispersion of the polymerizable monomer composition is fed to the reactor after splitting ir, and the monomer dispersion having been split is moving at constant speed in the reactor. In this case, the rate of mixture as well as diffusion in the moving direction of the monomer dispersion is negligibly small, and the concentration distribution of the dispersion in the direction perpendicular to the moving direction has substantially become even.

As a specific method to obtain a plug flow property, for example, provided is a method of making a ratio (relationship) (La/D) to be large (for example, exceeding 100), wherein the ratio is a ratio of length (La) of a cylindrical channel to inner diameter (D) of the cylindrical channel, but in such a case, difficulty in downsizing of the tubular flow reactor results. In the above-described Patent Document, any of the literatures has disclosed a tube type reactor fitted with a plug flow property, but no description indicating a technique by which a reactor is downsized has been seen.

Patent Document 1: Japanese Patent O.P.I. (Open to Public Inspection) Publication No. 2003-140386

Patent Document 2: Japanese Patent O.P.I. Publication No. 2004-250627

Patent Document 3: Japanese Patent O.P.I. Publication No. 2008-291250

DISCLOSURE OF THE INVENTION

Problems to be Solved by the Invention

In the present invention, a tubular flow reactor can maintain a plug flow property even though the tubular flow reactor is downsized, and provided is the tubular flow reactor with which uniform resin fine particles exhibiting a narrow particle size distribution and a narrow molecular weight distribution can be prepared when the tubular flow reactor is used for preparation of the resin fine particle via emulsion polymerization or the like.

Means to Solve the Problems

The present invention is accomplished by the following structures.

(Structure 1) A tubular flow reactor comprising a stirring blade and a cylindrical channel, wherein a ratio d/D is 0.3-0.9 when a diameter of the stirring blade is represented by d and an inner diameter of the cylindrical channel is represented by D, and a ratio Lb/La is 0.80-0.99 when a length of the stirring blade is represented by Lb and a length of the cylindrical channel is represented by La.

(Structure 2) The tubular flow reactor of Structure 1, wherein a ratio La/D of length La of the cylindrical channel to inner diameter D of the cylindrical channel is 1-100.

(Structure 3) The tubular flow reactor of Claim 2, wherein a ratio La/D of length La of the cylindrical channel to inner diameter D of the cylindrical channel is 5-20.

(Structure 4) A method of manufacturing polymeric resin particles, comprising the step of preparing the polymeric resin fine particles employing a tubular flow reactor comprising a stirring blade and a cylindrical channel, wherein a ratio d/D is 0.3-0.9 when a diameter of the stirring blade is represented by d and an inner diameter of the cylindrical channel is represented by D, and a ratio Lb/La is 0.80-0.99 when a length of the stirring blade is represented by Lb and a length of the cylindrical channel is represented by La.

(Structure 5) The method of Structure 4, wherein a ratio La/D of length La of the cylindrical channel to inner diameter D of the cylindrical channel is 1-100.

(Structure 6) The method of Structure 5, wherein a ratio La/D of length La of the cylindrical channel to inner diameter D of the cylindrical channel is 5-20.

Effect of the Invention

A tubular flow reactor of the present invention can maintain a plug flow property even though the tubular flow reactor is downsized, and when the tubular flow reactor is used for preparation of the resin fine particle via emulsion polymerization or the like, produced are excellent effects through which uniform resin particles exhibiting a narrow particle size distribution and a narrow molecular weight distribution are obtainable.

EXPLANATION OF NUMERALS

| | |
|---|---|
| 1 | Inlet of a polymerizable reactive solution |
| 2 | Outlet of resin fine particles |
| 3 | Jacket |
| 4 | Stirring blade |
| 5 | Stirring shaft |
| 6 | Cylindrical channel |
| 7 | Plug flow portion |
| 8 | Tubular flow reactor |
| D | Inner diameter of cylindrical channel |
| La | Length of cylindrical channel |
| d | Diameter of stirring blade |
| Lb | Length of stirring blade |

DESCRIPTION OF THE PREFERRED EMBODIMENTS

It has been studied by the inventors that a tubular flow reactor can maintain a plug flow property even though the reactor is downsized by reducing a ratio La/D of length La of a cylindrical channel to inner diameter D of the cylindrical channel, and the tubular flow reactor can obtain resin fine particles having uniform particle size together with uniform molecular weight, when the tubular flow reactor is used for preparation of the resin fine particle via emulsion polymerization or the like.

After considerable effort during intensive studies, it is found out that solved can be a problem such that resin fine particles exhibit a broad particle size distribution as well as a broad molecular weight distribution in the case of utilizing for preparation of resin fine particles via emulsion polymerization or the like, when using a tubular flow reactor for which a ratio d/D of diameter d of a stirring blade to inner diameter D of a cylindrical channel is set to 0.3-0.9, and a ratio Lb/La of length Lb of the stirring blade to length La of the cylindrical channel is set to 0.80-0.99.

In the present invention, it is found out that a tubular flow reactor capable of acquiring a plug flow property can be obtained by specifying each of a ratio of a diameter of a stirring blade to an inner diameter of a cylindrical channel, and a ratio of a length of the stirring blade to a length of the cylindrical channel via focusing on presence of the stirring blade constituting the tubular flow reactor. That is, as a method to obtain a plug flow property for the tubular flow reactor, it is found out that a means to produce this effect is present without necessarily focusing on the relationship between the inner diameter and length of the cylindrical channel. Since no description and suggestion concerning findings obtained via action as a means by which the stirring blade constituting the tubular flow reactor exhibits a plug flow property as described above is seen in the foregoing cited references 1-3, it appears to the inventors that these findings have been found out by the inventors for the first time.

That is, the inventors found out that a structure of the stirring blade acted as a factor to obtain a plug flow property of the reactor, and the plug flow property was designed to be obtained from this finding without specifying the relationship between the inner diameter and length of the cylindrical channel by which the reactor was forced to be large-sized. As a result, when a ratio of a diameter of the stirring blade to an inner diameter of the cylindrical channel, and a ratio of a length of the stirring blade to a length of the cylindrical channel each fall within the prescribed range, it appears that polymeric resin fine particles exhibiting a sharp particle size distribution and a narrow molecular weight distribution are obtainable, whereby the reactor is possible to be downsized.

Next, the present invention will be described in detail.
(Tubular Flow Reactor)

The tubular flow reactor of the present invention is a reactor equipped with a stirring blade in a cylindrical channel, exhibiting a plug flow property (pressed flow property). The tubular flow reactor of the present invention is a reactor suitable for reaction depending on time, and for example, is preferable for polymerization reaction to produce resin fine particles, such as suspension polymerization and emulsion polymerization.

In addition, the cylindrical channel (plug flow portion) in the present invention is a channel whose cross-sectional shape is approximately circular.

By making the relationship (d/D) between the inner diameter and the diameter of stirring blade in the tubular flow reactor of the present invention to fall within the range of 0.3-0.9, stirring of a polymerizable reactive solution in the cylindrical channel can be promoted, and thermal convection in the cylindrical channel can be prevented. By making the flow in the radial direction of the channel to be stronger than that in the axis direction of the stirring blade, inhibited can be deterioration of a plug flow property and appearance of the residence time produced by the difference of specific gravity between raw materials in the reactive solution.

The foregoing effect is more preferably produced by making d/D to fall within the range of 0.5-0.7.

By making the relationship (Lb/La) between length of the stirring blade and length of the cylindrical channel to fall within the range of 0.80-0.99, flowing in the upper and lower directions is inhibited, and both of heat transfer and reaction can be simultaneously achieved while maintaining a plug flow property. It is more preferable that (Lb/La) is 0.90-0.99 via inhibition of flowing in the upper and lower directions.

Ratio La/D of length of the flow channel La to inner diameter of the cylindrical channel D is preferably 1-100, and more preferably 5-20. It is preferable that reducing La/D can reduce the whole apparatus in size.

Next, the tubular flow reactor of the present invention will be specifically described.

Figure 1:
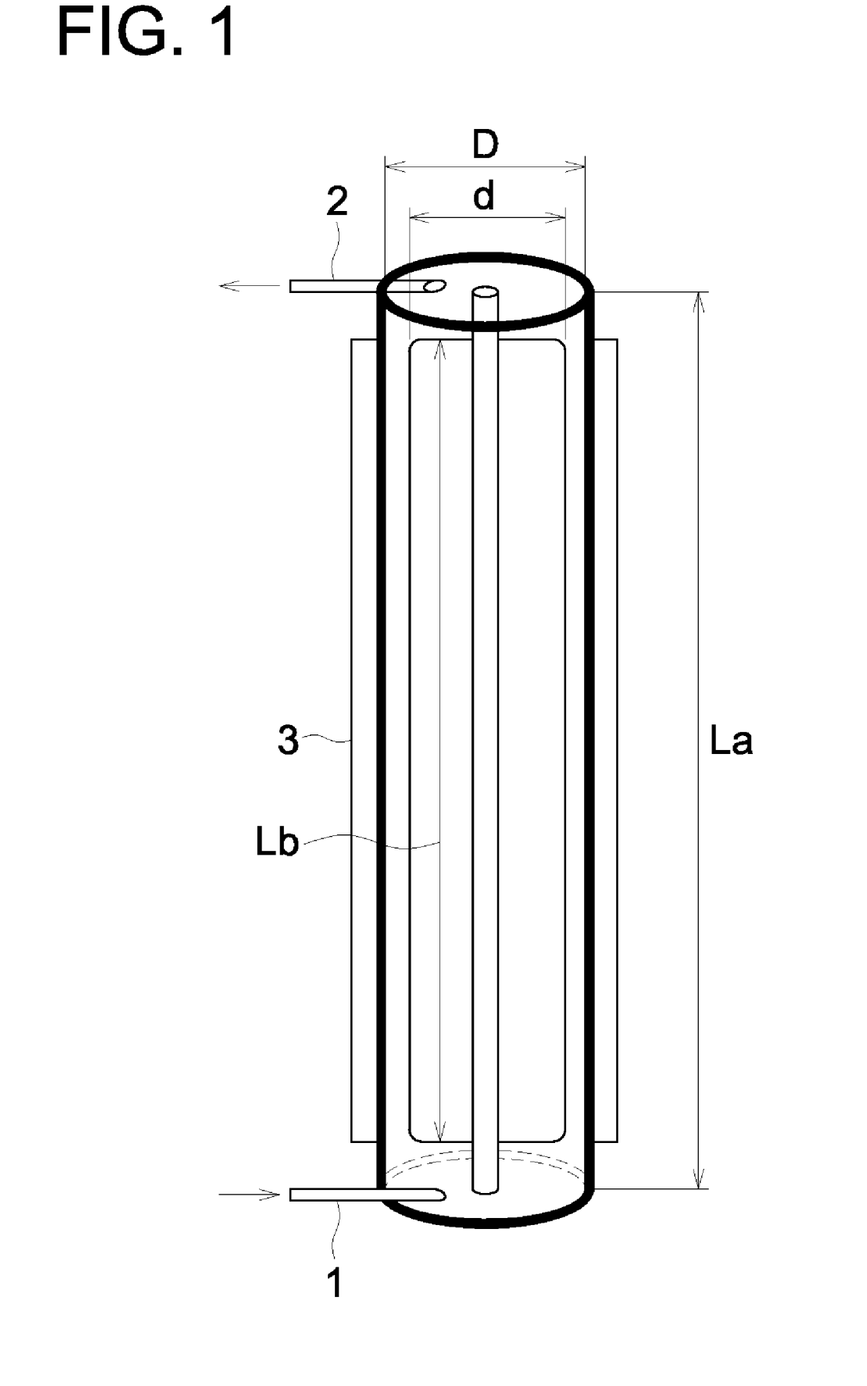
FIG. 1 is a schematic diagram showing an example of a tubular flow reactor of the present invention.

FIG. 1 is a schematic diagram showing an example of a tubular flow reactor of the present invention.

In FIG. 1, numeral 1 represents an inlet of a polymerizable reactive solution, numeral 2 represents an outlet of resin fine particles, numeral 3 represents a jacket, D represents an inner diameter of a cylindrical channel; La represents a length of the cylindrical channel; d represents a diameter of a stirring blade, and Lb is a length of the stirring blade.

The tubular flow reactor is preferably equipped with a jacket capable of heating or cooling a reactive solution.

Further, the substance of the cylindrical channel as well as the stirring blade in the tubular flow reactor is preferably one having been subjected to a surface treatment to provide excellent corrosion resistance and no contamination adhesion. Specifically, those having been subjected to a glass lining treatment or a fluorinated resin treatment are preferable.

Figure 2:
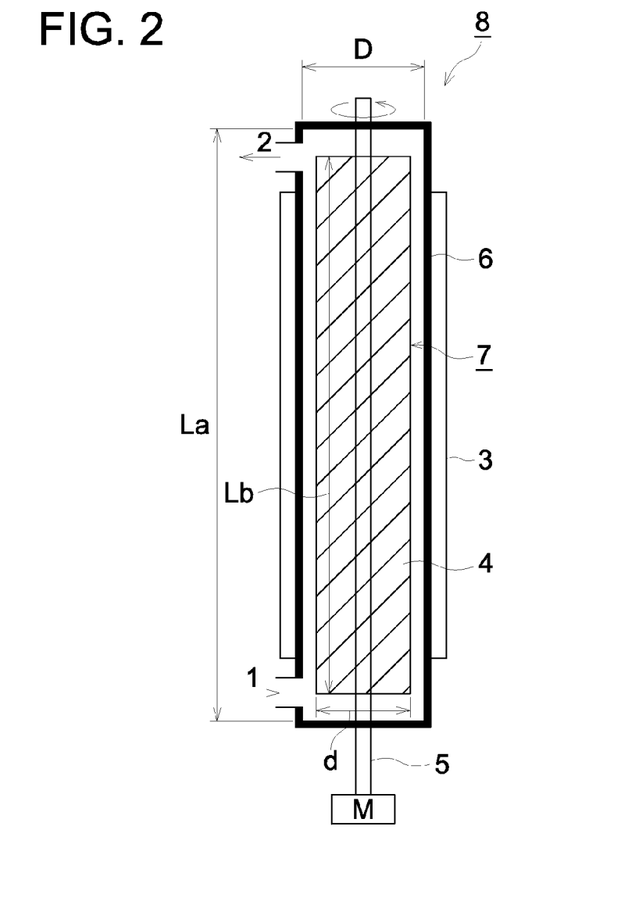
FIG. 2 is a schematic cross-sectional view in the flow direction, showing an example of a tubular flow reactor of the present invention.

FIG. 2 is a schematic cross-sectional view in the flow direction, showing an example of a tubular flow reactor of the present invention.

In FIG. 2, numeral 1 represents an inlet of a polymerizable reactive solution, numeral 2 represents an outlet of resin fine particles, numeral 3 represents a jacket, numeral 4 represents a stirring blade, numeral 5 is a rotating shaft of the stirring blade, numeral 6 is a cylindrical channel, numeral 7 is a plug flow portion, numeral 8 is a tabular flow reactor, D is an inner diameter of the cylindrical channel, La represents a length of the cylindrical channel, d represents a diameter of the stirring blade, and Lb represents a length of the stirring blade.

Figure 3:
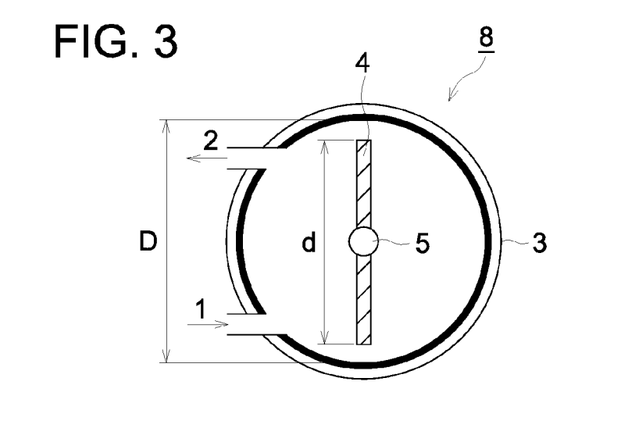
FIG. 3 is a schematic cross-sectional view in the direction perpendicular to the flow, showing an example of a tubular flow reactor of the present invention.

FIG. 3 is a schematic cross-sectional view in the direction perpendicular to the flow, showing an example of a tubular flow reactor of the present invention.

When resin fine particles are prepared with the tubular flow reactor of the present invention, obtained can be resin fine particles having a narrow molecular weight distribution (a ratio Mw/Mn of weight average molecular weight Mw to number average molecular weight Mn is 2.5 or less, for example), and a particle diameter distribution {a variation coefficient (CV value) in n volume-based particle size distribution with respect to resin fine particles is 20% or less, for example}, since the residence time in the apparatus becomes even while keeping a plug flow property even though the apparatus is downsized.

(Stirring Blade)

The stirring blade of the present invention is not specifically limited as long as the relationship of d/D=0.3 to 0.9 as well as Lb/La=0.80 to 0.99 is satisfied.

The number of stirring blades is not specifically limited as long as it is at least one, but it is preferably provided at regular intervals with respect to a circumference. When the number of stirring blades is plural, if at least one stirring blade to satisfy the relationship of d/D=0.3 to 0.9 as well as Lb/La=0.80 to 0.99 is present, the effect of the present invention is produced.

Further, one stirring blade may have varied diameter D of the stirring blade having concavity and convexity. When having the varied diameter, at least 90% of length Lb of the stirring blade preferably possess shape to satisfy the relationship of d/D=0.3 to 0.9.

One stirring blade may have varied length Lb of the stirring blade having concavity and convexity. When having the varied length, at least 90% of diameter D of the stirring blade preferably possess shape to satisfy the relationship of Lb/La=0.80 to 0.99.

Further, the stirring blade may be any blade in the form of one plate, in the form of a slit in which a slit portion is provided for the stirring blade, or the like, but in the case of a large stirring blade, the shape in the form of a slit is preferable in order to reduce a load to the stirring blade.

Figure 4A:
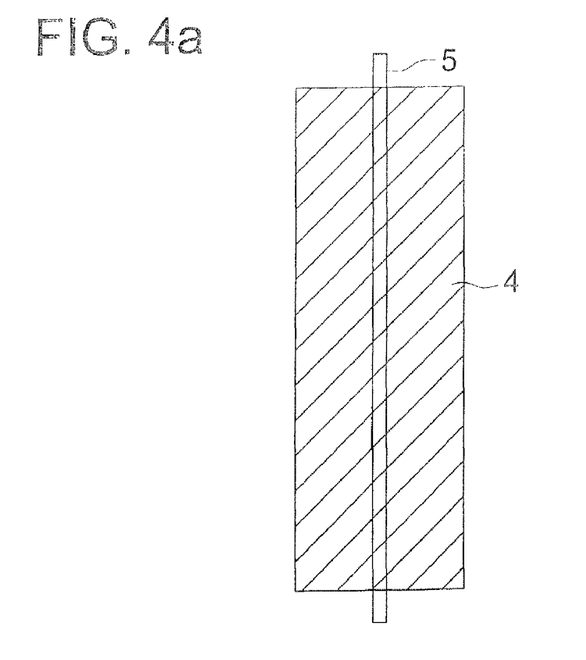
FIGS. 4a and 4b each are a diagram showing an example of shape of a stirring blade used in the present invention.
Figure 4B:
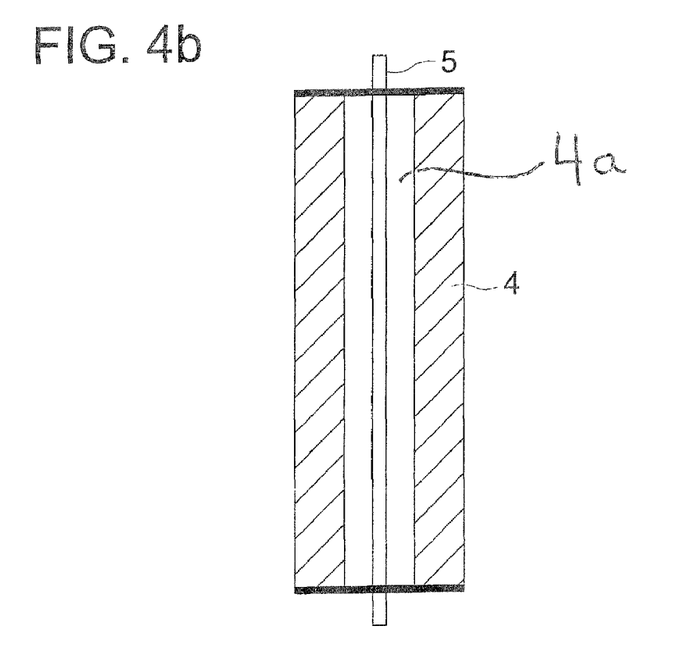

FIGS. 4a and 4b each are a diagram showing an example of shape of a stirring blade used in the present invention.

FIG. 4a shows a stirring blade in the form of a plate, and FIG. 4b shows a stirring blade provided with slit 4a.

Figure 5:
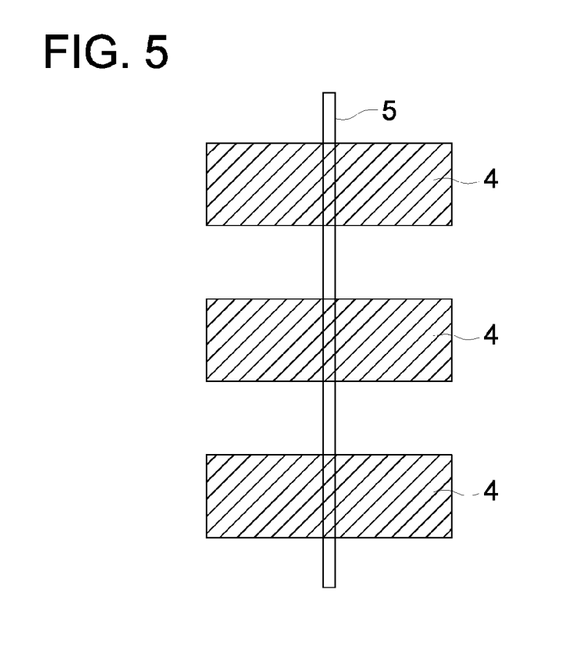
FIG. 5 is a diagram showing an example of shape of a stirring blade used in a comparative example with respect to the present invention.

FIG. 5 is a diagram showing an example of shape of a stirring blade used in a comparative example with respect to the present invention.

FIG. 5 shows an example with one short stirring blade in length, dissatisfying the relationship of Lb/La=0.80 to 0.99.

(Resin Fine Particles of Continuous Manufacturing Apparatus)

Next, continuous manufacturing apparatus to continuously prepare resin fine particles employing a tubular flow reactor of the present invention will be described.

The tubular flow reactor is equipped with additional devices such as a device to supply a polymerizable reactive solution, a device to rotate a stirring blade, a device to take out a solution after completing reaction, a control device to control the reaction, and so forth.

The continuous manufacturing apparatus is mainly composed of an oil droplet dispersion preparation apparatus and a tubular flow reactor.

Figure 6:
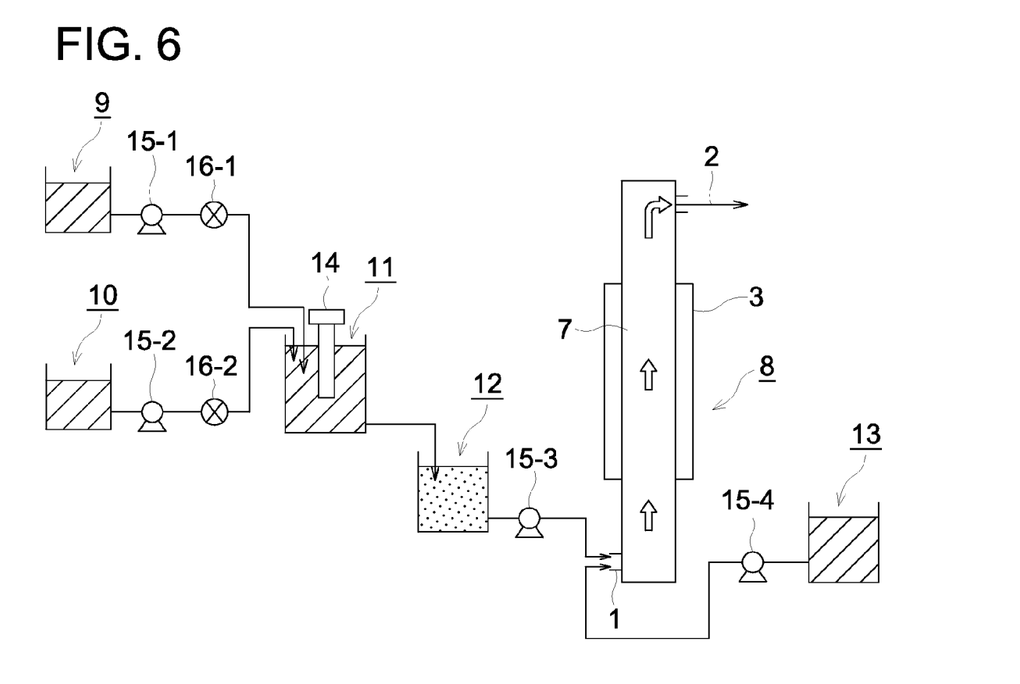
FIG. 6 is a diagram showing an example of a continuous manufacturing apparatus to prepare resin fine particles, composed of an oil droplet dispersion preparation apparatus and a tubular flow reactor.

FIG. 6 is a diagram showing an example of a continuous manufacturing apparatus to prepare resin fine particles, composed of an oil droplet dispersion preparation apparatus and a tubular flow reactor.

In FIG. 6, numeral 11 represents an oil droplet dispersion preparation apparatus, numeral 8 represents a tubular flow reactor, numeral 9 represents a tank in which a polymerizable monomer and a chain transfer agent if desired are dissolved, numeral 10 represents a tank for a surfactant solution, numeral 12 represents a stock tank for an oil droplet dispersion, numeral 13 represents a tank for a polymerization initiator solution, numeral 14 represents an oil droplet preparation apparatus, each of numerals 15-1, 15-2, 15-3 and 15-4 represents a metering pump, and each of numerals 16-1 and 16-2 represents a valve.

A method of continuously preparing resin fine particles employing a tubular flow reactor of the present invention will be described.

Resin fine particles are prepared via the following steps.

1. A step of mixing and dissolving a polymerizable monomer and a chain transfer agent to store the resulting in a tank, 2. A step of dissolving a surfactant in water to store the resulting in a tank, 3. A step of charging an aqueous surfactant solution and a solution in which a polymerizable monomer and a chain transfer agent are mixed and dissolved into an oil droplet dispersion preparation apparatus via a valve to prepare an oil droplet dispersion having an oil droplet diameter of 50-500 μm employing a dispersing apparatus, 4. A step of temporarily storing the oil droplet in a tank, 5. A step of conducting continuous polymerization by controlling residence time, reaction polymerization temperature (T) and raw material feeding rate in a tubular flow reactor after continuously introducing a solution in which the droplet dispersion and the polymerization initiator in the stock tank are dissolved into the tubular flow reactor via the valve to prepare resin fine particles, and 6. A step of taking out a solution in which the resin fine particles are contained, from an outlet.

<Oil Droplet Dispersion Preparation Apparatus>

Oil droplet dispersion preparation apparatus 11 in FIG. 6 is employed to prepare an oil droplet dispersion having a specific oil droplet diameter by dispersing a solution in which a polymerizable monomer and a chain transfer agent if desired are dissolved, in an aqueous surfactant solution.

As oil droplet preparation apparatus 14, for example, provided can be mechanical dispersing apparatuses such as a stirrer equipped with a high speed rotor "CLEARMIX" (manufactured by M-Technique Co., Ltd.), an ultrasonic dispersing apparatus, a mechanical homogenizer, a Manton-Gaulin homogenizer, and a pressure homogenizer. Of these, the ultrasonic dispersing apparatus is preferable since the intended oil droplet is easily obtained.

Since the oil droplet particle diameter depends on element shape and output of an ultrasonic dispersing apparatus, a solution formula to prepare oil droplets, or an aqueous surfactant solution formula, the processing conditions of the oil droplet dispersion preparation apparatus are adjusted so as to appropriately obtain the intended oil droplet particle diameter.

An oil droplet having a diameter of 50-500 μm is preferably used. Oil droplets can be stably maintained in the dispersion by making the oil droplet diameter to fall within the above-described range.

The oil droplet diameter can be measured employing a commercially available particle size measuring apparatus by methods such as a light scattering method, a laser diffraction scattering method, a laser Doppler method and so forth. As a specific particle size measuring apparatus, Microtrack MT3300 (manufactured by Nikkiso Co., Ltd.) and LA-750 (manufactured by Horiba Co., Ltd.) are usable.

Tubular Flow Reactor

Tubular flow reactor 8 in FIG. 6 will be described.

Tubular flow reactor 8 is an apparatus composed of an inlet (numeral 1 in FIG. 6) to feed the resulting oil droplet dispersion and polymerization initiator solution into the tubular flow reactor; a plug flow section (numeral 7 in FIG. 6) in which polymerization reaction is conducted via plug flow while heating the fed solution in jacket 3 to prepare resin fine particles; and an outlet to take out a solution containing the resin fine particles.

An example of each dimension and shape of the tubular flow reactor is shown below.

Inner diameter of cylindrical channel D: 100 mm
Length of cylindrical channel La: 2000 mm
Diameter of stirring blade d: 80 mm
Length of stirring blade Lb: 1800 mm In this tubular flow reactor, a ratio Lb/La of length Lb of stirring blade to length La of cylindrical channel is 0.9; a ratio d/D of diameter d of stirring blade to inner diameter D of cylindrical channel is 0.8; and a ratio La/D of length La of cylindrical channel to inner diameter D of cylindrical channel is 20.

In addition, in order to maintain a plug flow property, uniform flow should be given by suppressing turbulence of the flow in the shaft direction within the tubular flow reactor. In order to do this, possible causes to produce the turbulence should be removed. For example, since temperature unevenness in the tubular flow reactor produces thermal convection, the tubular flow reactor is preferably designed in such a way that the flow in the shaft direction becomes even via temperature homogenization in the tubular flow reactor by increasing the heat transfer area with increase of La/D, and uniformization in surface shape of the inner wall of the tubular flow reactor.

The residence time, reaction polymerization temperature, and raw material (polymerizable dispersion) feeding rate are to be adjusted so as to obtain targeted resin fine particles. Specifically, the following conditions are preferably set.

Residence time in the tubular flow reactor: 5-200 min (preferably 10-120 min)
Reaction temperature: 60-98° C.
Raw material feeding speed: 10-10000 $cm^3$/min In addition, the above-described polymerization conditions are appropriately set depending on types and amounts to be used of a polymerizable monomer, a chain transfer agent, a surfactant and a polymerization initiator.

A polymerizable monomer, a chain transfer agent, a surfactant and a polymerization initiator, all of which are employed in preparation of resin fine particles, are described below.

(Polymerizable Monomer)

Resin fine particles of the present invention are composed of a polymer obtained via polymerization of at least one type of polymerizable monomer. The above-described polymerizable monomers include styrene or styrene derivatives, such as styrene, o-methylstyrene, m-methylstyrene, p-methylstyrene, α-methylstyrene, p-chlorostyrene, 3,4-dichlorostyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, and p-n-dodecylstyrene; methacrylic acid ester derivatives, such as methyl methacrylate, ethyl methacrylate, n-butyl methacrylate, iso-propyl methacrylate, iso-butyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate; acrylic acid ester derivatives, such as methyl acrylate, ethyl acrylate, iso-propyl acrylate, n-butyl acrylate, t-butyl acrylate, iso-butyl acrylate, n-octyl acrylate, 2-ethylhexyl acrylate, stearyl acrylate, lauryl acrylate, and phenyl acrylate; olefins, such as ethylene, propylene, and isobutylene; vinyl esters, such as vinyl propionate, vinyl acetate, and vinyl benzoate; vinyl ethers, such as vinyl methyl ether, and vinyl ethyl ether; vinyl ketones, such as vinyl methyl ketone, vinyl ethyl ketone, and vinyl hexyl ketone; N-vinyl compounds, such as N-vinyl carbazole, N-vinyl indole, and N-vinyl pyrrolidone; vinyl compounds, such as vinylnaphthalene, and vinylpyridine; and acrylic acids or methacrylic acid derivatives, such as acrylonitrile, methacrylonitrile, and acrylamide. These vinyl monomers may be used singly or in combination.

Further, a polymerizable monomer having an ionic dissociable group is preferably combined with the above monomer to constitute the resin. Examples of such polymerizable monomers are those having a substituent such as a carboxyl group, a sulfonic acid group, and a phosphoric acid group as the constituting group of the monomer. Specific examples of such polymerizable monomers include acrylic acid, methacrylic acid, maleic acid, itaconic acid, cinnamic acid, fumaric acid, maleic acid mono-alkyl ester, itaconic acid mono-alkyl ester, styrenesulfonic acid, allylsufosuccinic acid, 2-acrylamido-2-methylpropane sulfonic acid, acid phosphooxyethyl methacrylate, and 3-chloro-2-acid-phosphooxypropyl methacrylate.

Further, resins having a crosslinked structure using multifunctional vinyls are usable. Examples of such multi-functional vinyls include divinylbenzene, ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, and neopentyl glycol diacrylate.
(Polymerization Initiator)

The above-described polymerizable monomers can be polymerized using a radical polymerization initiator.

When a suspension polymerization method is used for preparation of resin fine particles, an oil soluble polymerization initiator can be used. Specific examples of an oil soluble polymerization initiator include: azo type or diazo type polymerization initiators such as 2,2'-azobis-(2,4-dimethylvaleronitrile), 2,2'-azobisisobutyronitrile, 1,1'-azobis-(cyclohexane-1-carbonitrile), 2,2'-azobis-4-methoxy-2,4-dimethylvaleronitrile, and azobisisobutyronitrile; peroxide type polymerization initiators such as benzoyl peroxide, methylethylketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, and tris-(t-butylperoxy)triazine; and polymer initiators having peroxide in side chains.

In the case of an emulsion polymerization method, a water soluble polymerization initiator can be used. Examples of a water soluble polymerization initiator include: persulfate salts such as potassium persulfate and ammonium persulfate and hydrogen peroxide, azobisamidinopropane acetate, azobiscyanovaleric acid and salts thereof, and hydrogen peroxide.

The polymerizaion initiator preferably has a content of 0.1-10.0% by weight, based on 100 parts by weight of the polymerizable monomer.
(Chain Transfer Agent)

As a chain transfer agent used during formation of resin fine particles, one having a chain transfer constant Cx of 1.9-17.1 is employed, and another one having a chain transfer constant Cx of 2.0-14.0 is preferably employed.

The use of a chain transfer agent having chain transfer constant Cx in the above-described region acts effectively on preparation of resin fine particles having a ratio of weight average molecular weight Mw to number average molecular weight Mn as an intended ratio in a tubular flow reactor, that is, resin fine particles having a ratio of Mw/Mn.

Herein, chain transfer constant means a ratio of a reaction speed constant of chain transfer during radical polymerization to a growth reaction speed constant. The chain transfer constant is defined by the following formulae.
Chain Transfer Reaction Growth Reaction $Cx = k_{tr,x}/k_p$ wherein Cx represents a chain transfer constant, ktr and x each represent a speed constant of a chain transfer reaction, ki represents a reaction speed constant during initiation of chain reaction, kp represents a growth reaction speed constant Pn• represents a polymer radical having the number of n chains (n=1, 2, 3 . . . ), RX represents a chain transfer agent, M represents a polymerizable monomer, and X• represents a chain transfer radical.

In addition, as described below, the chain transfer constant may also be represented by a ratio of differences in decrease of a chain transfer agent and a polymerizable monomer (a degree of decrease difference), and is, in this case, calculated by the following equation. In addition, the value of the chain transfer constant obtained by the following equation is equivalent to a chain transfer constant calculated out by the above-described formulae.

$Cx = d \log [RSH]/d \log [M]$ wherein RSH, M and Cx represent a remaining concentration of a chain transfer agent, a remaining concentration of a polymerizable monomer and a chain transfer constant, respectively.

The chain transfer constant of the present invention means a chain transfer constant when a polymerizable monomer is styrene (50° C.).

Practically, values given in the literature (e.g., POLYMER HANDBOOK) or values provided by manufacturers selling chain transfer agents may be used for the chain transfer constant.

However, In the case of no value in the literature, the values may be calculated out via experiment. In the method, at least four chain transfer agent concentration points including a zero level are taken, and bulk polymerization of styrene is carried out at 60° C. employing a initiator and an AIBN (azobisisobutyronitrile) in the presence of the chain transfer agent at each concentration level.

In this case, a reduced amount of the chain transfer agent is determined via a capillary column HR-1, and an addition rate of the polymerizable monomer and a molecular weight of a polymer are determined via GPC to calculate a chain transfer constant.

Chain transfer agents used in the present invention are not specifically limited, as long as it exhibits a chain transfer constant of 1.9-17.1 at 50° C. For example, the following can be provided.

| | |
|---|---|
| 1-octanethiol | 16.0, |
| Ethanethiol | 17.1 |
| t-octylmercaptan | 4.3 |
| t-dodecylmercaptan | 5.0 |
| benzthiazole | 2.1 |

The amount of the chain transfer agent to be used is preferably 0.5-5.0% by weight with respect to 100 parts by weight of the polymerizable monomer.
(Surfactant)

Surfactants employed when a solution containing a polymerizable monomer and a chain transfer agent in an aqueous solution is dispersed as oil droplets are not specifically limited, but the following ionic surfactants can be preferably listed below.

Examples of the ionic surfactants include sulfonic acid salts such as sodium dodecyl benzenesulfonate, sodium arylalkyl polyethersulfonate, sodium 3,3-disulfondiphenylurea-4,4-diazo-bis-amino-8-naphthol-6-sulfonate, ortho-caroxybenzene-azo-dimethylaniline and sodium 2,2,5,5-tetramethyl-triphenylmethane-4,4-diazo-bis-β-naphthol-6-sulfonate; sulfuric acid ester salts such as sodium dodecylsulfate, sodium tetradecylsulfate, sodium pentadecylsulfate and sodium octylsulfate; and fatty acid salts such as sodium oleate, sodium laurate, sodium caprate, sodium caprylate, sodium caproate, potassium stearate and calcium oleate.

Further, nonionic surfactants are also usable. Specific examples thereof include polyethylene oxide, polypropylene oxide, a combination of polypropylene oxide and polyethylene oxide, ester formed from polyethylene glycol and a higher fatty acid, alkylphenol polyethylene oxide, ester formed from a higher fatty acid and polyethylene glycol, ester formed from a higher fatty acid and polypropylene oxide, and sorbitan ester.

Next, properties of resin fine particles will be described.

{Weight Average Molecular Weight Mw, and Ratio (Mw/Mn) of Weight Average Molecular Weight Mw to Number Average Molecular Weight Mn}

Resin fine particles prepared via polymerization employing a tubular flow reactor of the present invention preferably have a weight average molecular weight Mw of 10,000-15,000, and preferably have a ratio of 2.5 or less, as a ratio (Mw/Mn) of weight average molecular weight Mw to number average molecular weight Mn.

The molecular weight of resin fine particles can be determined via gel permeation chromatography (GPC) employing a tetrahydrofuran (THF) as a column solvent.

In the method of measuring molecular weight of resin fine particles via gel permeation chromatography (GPC), a measuring sample is dissolved in tetrahydrofuran so as to give a concentration of 1 mg/ml, and stirring is carried out employing an ultrasonic dispersion apparatus at room temperature for 5 minutes. Next, the resulting is subjected to membrane filtration through a membrane filter having a pore size of 0.2 μm, followed by charging 10 μL of a sample dissolving solution into GPC. Specific examples of the GPC measurement conditions are shown below.

Apparatus: HLC-8220 (manufactured by Tosoh Co., Ltd.)
    Column: TSK guard column+TSK gel Super HZM-M3 continuous (manufactured by Tosoh Co., Ltd.)
    Column temperature: 40° C.
    Solvent: Tetrahydrofuran
    Flow speed: 0.2 ml/min.
    Detector: Refractive index detector (RI detector)

In the molecular weight measurement of a sample, a molecular weight distribution of the sample is calculated employing a calibration curve measured by using monodispersed polystyrene standard particles. About ten types of such polystyrene standard particles are used to prepare the calibration curve.

(Particle Diameter of Resin Fine Particle, and CV Value)

Further, as the particle diameter of the resulting resin fine particles, a volume-based median diameter $Dv_{50}$ of 50 nm-500 μm is preferably obtainable. Herein, volume-based median diameter $Dv_{50}$ means a particle diameter of the resin fine particle for which the number of counts (cumulative value) corresponds to 50% of the total number of particles, when particle diameters of resin fine particles each having a certain volume are counted in descending order or in ascending order.

Further, the resulting resin fine particles preferably have a coefficient of variation (hereinafter, referred to also as CV value) of 20% or less, as a coefficient of variation in the volume-based particle size distribution of resin fine particles constituting the resulting resin fine particles. When the coefficient of variation falls within the above-described range, resin fine particles exhibit sharp particle size distribution.

In addition, the coefficient of variation in a volume-based particle distribution of resin particles is calculated by the following equation.

$$\text{Coefficient of variation(CV value)(\%)} = \{(\text{Standard deviation in volume-based particle size distribution})/(\text{volume-based median diameter } Dv_{50})\} \times 100$$

Volume-based median diameter $Dv_{50}$ and coefficient of variation (CV value) of resin fine particles in the present invention can be measured via an apparatus in which a computer system for data processing (manufactured by Beckman Coulter Inc.) is connected to Multisizer 3 (manufactured by Beckman Coulter Inc.), Microtrack UPA-150 (manufactured by Nikkiso Co., Ltd.) or the like.

The measuring instruments and measuring conditions are chosen so as to give a measurement range suitable for the resulting resin particulates.

The tubular flow reactor of the present invention is suitable for preparation of resin fine particles having the above-described volume-based median diameter $Dv_{50}$ and CV value.

Resin fine particles prepared in the present invention are usable for toner and a spacer in a liquid crystal, for example.

EXAMPLE

The present invention is detailed below referring to examples, but embodiments in the present invention are not limited thereto.

Example 1

Resin fine particles were prepared by the following procedures, employing a continuous resin fine particle manufacturing apparatus shown in the foregoing FIG. 6.

(1) Preparation of Surfactant Solution

The following materials were mixed and dissolved to prepare a surfactant solution.

| | |
|---|---|
| Sodium dodecylsulfate | 0.82 parts by weight |
| Deionized water | 539.18 parts by weight |

(2) Preparation of Polymerizable Monomer Solution

The following materials were mixed and dissolved to prepare a polymerizable monomer solution.

| | |
|---|---|
| Styrene | 67.7 parts by weight |
| n-butyl acrylate | 19.9 parts by weight |
| Methacrylic acid | 10.9 parts by weight |
| t-octylmercaptan | 2.2 parts by weight |

(3) Preparation of Oil Droplet Dispersion

The polymerizable monomer solution prepared above was dispersed in the surfactant solution employing a mechanical dispersion apparatus ("US homogenizer 300T" manufactured by Nissei Corporation) so as to reach an oil droplet diameter of 100 nm, and an oil droplet dispersion was prepared.

(4) Preparation of Polymerization Initiator Solution

The following materials were mixed and dissolved to prepare a polymerization initiator solution.

| | |
|---|---|
| Polymerization initiator (potassium persulfate) | 9.2 parts by weight |
| Deionized water | 200.0 parts by weight |

(5) Polymerization Step

As a tubular flow reactor, employed is reactor 1 having in size, inner diameter D of the cylindrical channel, length La of the cylindrical channel La, diameter d of the stirring blade, and length Lb of the stirring blade.

Inner diameter D: 100 mm
Length La of the cylindrical channel: 200 mm
Diameter d of the stirring blade: 80 mm
Length Lb of the stirring blade: 180 mm
La/D=2
d/D=0.8
Lb/La=0.90

The oil droplet dispersion prepared as described above was continuously charged from oil droplet dispersion inlet 1 at a rate of 336 cm$^3$/min and at the same time the polymerization initiator solution was continuously charged at a rate of 64 cm$^3$/min., and after plug flow section 7 was adjusted so as to give am inner temperature of 90° C. and a residence time of 40 min, polymerization was continuously conducted to prepare resin fine particles. This is designated as "resin fine particle 1".

Examples 2-10

Resin fine particles were prepared similarly to preparation of Example 1, except that reactor 2 for which each dimension of the tubular flow reactor used in Example 1 was replaced by those described in Table 1 was employed. This is designated as "resin fine particles 2-9, and 13".

Comparative Examples 1-3

Resin fine particles were prepared similarly to preparation of Example 1, except that reactors 10-12 for which each dimension of the tubular flow reactor used in Example 1 was replaced by those described in Table 1 were employed. This is designated as "resin fine particles 10-12".

Comparative Example 4

"Resin particle 14" was similarly prepared, except that the stirring blade in Example 7 was taken out.

Comparative Example 5

"Resin fine particle 15" was similarly prepared, except that the cylindrical tube in Example 1 was replaced by a square shaped tube whose cross-section is a rectangle, and each dimension of the tubular flow reactor was replaced by those described in Table 1.

In Table 1, tubular flow reactor, stirring blade, inner diameter D of cylindrical channel, length La of cylindrical channel, diameter D of stirring blade, length Lb of stirring blade and so forth are shown.

TABLE 1

| | Reactor | Stirring blade | Inner diameter of channel D (mm) | Diameter of stirring blade d (mm) | d/D | Length of channel La (mm) | Length of stirring blade Lb (mm) | Lb/La | La/D |
|---|---|---|---|---|---|---|---|---|---|
| Reactor 1 | Cylindrical tube | Provided | 100 | 80 | 0.8 | 200 | 180 | 0.90 | 2 |
| Reactor 2 | Cylindrical tube | Provided | 500 | 400 | 0.8 | 2500 | 2375 | 0.95 | 5 |
| Reactor 3 | Cylindrical tube | Provided | 50 | 25 | 0.5 | 2500 | 2125 | 0.85 | 50 |
| Reactor 4 | Cylindrical tube | Provided | 200 | 60 | 0.3 | 20000 | 18000 | 0.90 | 100 |
| Reactor 5 | Cylindrical tube | Provided | 100 | 80 | 0.8 | 2000 | 1800 | 0.90 | 20 |
| Reactor 6 | Cylindrical tube | Provided | 200 | 120 | 0.6 | 6000 | 5700 | 0.95 | 30 |
| Reactor 7 | Cylindrical tube | Provided | 35 | 17.5 | 0.5 | 700 | 693 | 0.99 | 20 |
| Reactor 8 | Cylindrical tube | Provided | 500 | 450 | 0.9 | 3500 | 3150 | 0.90 | 7 |
| Reactor 9 | Cylindrical tube | Provided | 100 | 70 | 0.7 | 3000 | 2400 | 0.80 | 30 |
| Reactor 10 | Cylindrical tube | Provided | 35 | 33.6 | 0.96 | 1750 | 1400 | 0.80 | 50 |
| Reactor 11 | Cylindrical tube | Provided | 500 | 100 | 0.2 | 2500 | 2000 | 0.80 | 5 |
| Reactor 12 | Cylindrical tube | Provided | 200 | 80 | 0.4 | 16000 | 11200 | 0.70 | 80 |
| Reactor 13 | Cylindrical tube | Provided | 100 | 70 | 0.7 | 20000 | 19000 | 0.95 | 200 |
| Reactor 14 | Cylindrical tube | Not provided | 35 | — | — | 1750 | — | — | 50 |
| Reactor 15 | Square-shaped tube | Provided | *45 | 9 | 0.2 | 2250 | 1800 | 0.80 | 50 |

*Length on a side

In FIG. 2, reactor employed for preparation of resin fine particles, formed product, particle diameter, CV value, Mw, and Mw/Mn are shown.

TABLE 2

|  |  | Formed product | Particle diameter (nm) | CV value | Mw | Mw/Mn |
|---|---|---|---|---|---|---|
| Example 1 | Reactor 1 | Latex | 130 | 16 | 13000 | 2.4 |
| Example 2 | Reactor 2 | Latex | 115 | 12 | 12000 | 2.3 |
| Example 3 | Reactor 3 | Latex | 90 | 14 | 14000 | 2.2 |
| Example 4 | Reactor 4 | Latex | 140 | 15 | 15000 | 2.5 |
| Example 5 | Reactor 5 | Latex | 80 | 11 | 13000 | 2.0 |
| Example 6 | Reactor 6 | Latex | 100 | 15 | 13500 | 2.4 |
| Example 7 | Reactor 7 | Latex | 90 | 13 | 12000 | 1.7 |
| Example 8 | Reactor 8 | Latex | 110 | 12 | 12000 | 2.1 |
| Example 9 | Reactor 9 | Latex | 140 | 17 | 14000 | 2.4 |
| Example 10 | Reactor 13 | Latex | 130 | 18 | 12500 | 2.5 |
| Comparative example 1 | Reactor 10 | Latex | 320 | 27 | 14000 | 3.3 |
| Comparative example 2 | Reactor 11 | Aggregation substance | — | — | 32000 | 3.5 |
| Comparative example 3 | Reactor 12 | Latex | 290 | 30 | 20000 | 3.1 |
| Comparative example 4 | Reactor 14 | Aggregation substance | — | — | 35000 | 3.8 |
| Comparative example 5 | Reactor 15 | Latex | 310 | 31 | 19000 | 2.9 |

As characteristic evaluation of the resulting resin fine particles, a CV value of 20% or less for evenness of the particle diameter, and an evenness of molecular weight of 2.5 or less each are determined to be an acceptable level.

It is to be understood that in the case of "resin fine particles 1-9 and 13 obtained in Examples 1-10, a weight average molecular weight Mw of 10000-15000; a ratio Mw/Mn of 2.5 or less as a ratio of weight average molecular weight Mw to number average molecular weight Mn; a volume-based median diameter $D_{50}$ of 80-140 nm; and a coefficient of variation (CV value) of 20% or less in a volume-based particle size distribution of resin fine particles each result in an acceptable level, but in the case of "resin fine particles 10-12 and 14-15" in Comparative examples 1-5, any of the Mw/Mn and the CV value falls outside the above-described range.

In addition, the Mw, the Mw/Mn, the particle diameter and the CV value are values obtained by measuring via the foregoing method.

As described above, in the case of "Examples 1-10" in relation to "reactors 1-9 and 13" corresponding to tubular flow reactors in the present invention, it was confirmed that a plug flow property was maintained even though the reactor was downsized, and produced were effects of the present invention through which uniform resin fine particles exhibiting a narrow particle size distribution and a narrow molecular weight distribution were obtainable by utilizing for preparation of the resin fine particles via emulsion polymerization or the like.

The invention claimed is:

1. A tubular flow reactor comprising a stirring blade and a cylindrical channel,
   wherein a ratio d/D is 0.3-0.9 when a diameter of the stirring blade is represented by d and an inner diameter of the cylindrical channel is represented by D, and a ratio Lb/La is 0.80-0.99 when a length of the stirring blade is represented by Lb and a length of the cylindrical channel is represented by La, and
   wherein a ratio La/D of length La of the cylindrical channel to inner diameter D of the cylindrical channel is 5-20.

2. A method of manufacturing polymeric resin fine particles, comprising the step of:
   preparing the polymeric resin fine particles employing a tubular flow reactor comprising a stirring blade and a cylindrical channel,
   wherein a ratio d/D is 0.3-0.9 when a diameter of the stirring blade is represented by d and an inner diameter of the cylindrical channel is represented by D, and a ratio Lb/La is 0.80-0.99 when a length of the stirring blade is represented by Lb and a length of the cylindrical channel is represented by La, and
   wherein a ratio La/D of length La of the cylindrical channel to inner diameter D of the cylindrical channel is 5-20.

* * * * *